(12) United States Patent
Belyy

(10) Patent No.: US 9,525,673 B1
(45) Date of Patent: Dec. 20, 2016

(54) CONTENT PROTECTION FOR EXTRACT, TRANSFORM, LOAD (ETL) SCRIPTS

(71) Applicant: SAP SE, Walldorf (DE)

(72) Inventor: Andrey Belyy, Sunnyvale, CA (US)

(73) Assignee: SAP SE, Walldorf, DE (US)

( * ) Notice: Subject to any disclaimer, the term of this patent is extended or adjusted under 35 U.S.C. 154(b) by 31 days.

(21) Appl. No.: 14/725,107

(22) Filed: May 29, 2015

(51) Int. Cl.
*H04L 29/06* (2006.01)
*H04L 9/32* (2006.01)

(52) U.S. Cl.
CPC ........... *H04L 63/061* (2013.01); *H04L 9/3247* (2013.01); *H04L 63/0876* (2013.01)

(58) Field of Classification Search
CPC ..................................................... H04L 63/061
USPC .......................................................... 713/171
See application file for complete search history.

(56) References Cited

U.S. PATENT DOCUMENTS

| | | | |
|---|---|---|---|
| 6,880,083 B1 * | 4/2005 | Korn ........................ | G06F 21/52 713/170 |
| 2005/0289072 A1 * | 12/2005 | Sabharwal ............ | G06F 21/121 705/59 |
| 2013/0191306 A1 * | 7/2013 | Wilkinson ........... | G06Q 10/067 705/348 |

\* cited by examiner

*Primary Examiner* — Longbit Chai
(74) *Attorney, Agent, or Firm* — Fountainhead Law Group P.C.

(57) ABSTRACT

Embodiments encrypt Extract, Transform, Load (ETL) scripts created by a developer for an initial customer, against unauthorized access and copying. Such protection preserves the economic value of the ETL script for the developer, allowing re-use with other customers (who could otherwise simply copy the ETL script from the initial customer). A new hidden attribute is introduced to indicate ownership and protection of an object used in an ETL utility. A customer will not see this hidden attribute via the ETL utility. The hidden attribute may be assigned programmatically during a protecting process, and its value may be a current keycode (e.g., the signature of the developer's license of the ETL utility). The protected object thus has the attribute signature, and its value does not match any current keycode known to the customer. The signature for internal decryption of the script by the ETL utility, could be supplied by the developer.

20 Claims, 11 Drawing Sheets

```
if ($julian is null)
begin
    return null;
end $Year = ($julian / 1000);
$Days = $julian - ($Year * 1000) - 1;
$Year = $Year + 1900;
$YearBegin = '01/01/' || $Year;

return to_date($YearBegin, 'MM/DD/YYYY') + $Days;
```

FIG. 2C

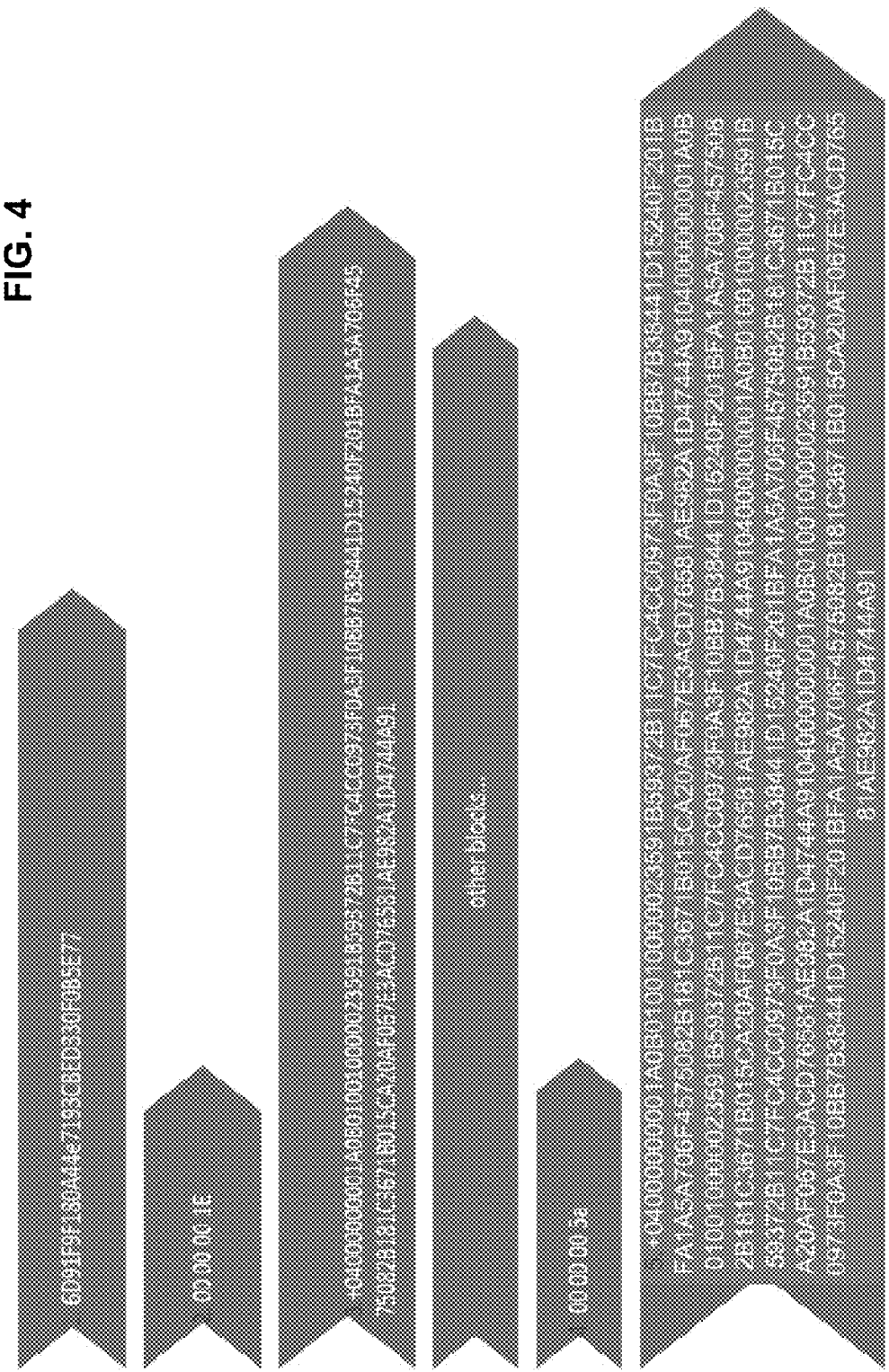

CONTENT PROTECTION FOR EXTRACT, TRANSFORM, LOAD (ETL) SCRIPTS

BACKGROUND

Unless otherwise indicated herein, the approaches described in this section are not prior art to the claims in this application and are not admitted to be prior art by inclusion in this section.

Embodiments relate to databases, and in particular, to a mechanism of protecting the content for Extract, Transform, Load (ETL) scripts.

ETL is the process by which data from one or more sources, is made available in a database having a specific structure. In the (E)xtract phase, data is provided from the data source. In the (T)ransform phase, that data from the source is converted into a format suitable for storage in the database. In the (L)oad phase, the converted data is placed in appropriate locations within the database.

In some cases, the computer language that is utilized to perform ETL processes, may be visible and available to the user. For example, the Active Template Library (ATL) is a data services scripting language to execute ETL jobs for databases available from SAP SE, of Walldorf, Germany.

Because the script of ATL is in the form of text, it is easy to copy. This potentially renders ETL jobs and their constituent data, visible to outsiders. Such a situation poses a security risk and the potential loss of economic value by allowing unauthorized entities to copy those ETL scripts.

SUMMARY

Embodiments encrypt Extract, Transform, Load (ETL) scripts created by a developer for an initial customer, against unauthorized access and copying. Such protection preserves the economic value of the script for the developer, allowing re-use with other customers (who could otherwise simply copy the ETL script from the initial customer). A new hidden attribute is introduced to indicate ownership and protection of an object used in an ETL utility. A customer will not see this hidden attribute via the ETL utility. The hidden attribute may be assigned programmatically during a protecting process, and its value may be a current keycode (e.g., the signature of the developer's license of the ETL utility). The protected object thus has the attribute signature, and its value does not match any current keycode known to the customer. The signature for internal decryption of the script by the ETL utility, could be supplied by the developer.

An embodiment of a computer-implemented method comprises providing an engine in communication with a database. The engine receives from a developer, a key and an Extract, Transform, and Load (ETL) script. The engine generates an encrypted ETL script utilizing the key. The engine receives from a customer of the developer, data and the encrypted ETL script. The engine decrypts the encrypted ETL script utilizing the key to produce the ETL script. The engine executing the ETL script to load the data into the database.

A non-transitory computer readable storage medium embodies a computer program for performing a method comprising, an engine provided by a first entity and in communication with a database. The engine receives a key and an Extract, Transform, and Load (ETL) script from a second entity. The engine generates an encrypted ETL script utilizing the key. The engine receives from a third entity, data and the encrypted ETL script. The engine decrypts the encrypted ETL script utilizing the key to produce the ETL script. The engine executes the ETL script to load the data into the database.

An embodiment of a computer system comprises one or more processors and a software program, executable on said computer system. The software program is configured to cause an engine to receive from a developer, a key and an Extract, Transform, and Load (ETL) script. The software program is further configured to cause the engine to generate an encrypted ETL script utilizing the key, to receive data and the encrypted ETL script, and to decrypt the encrypted ETL script utilizing the key to produce the ETL script. The software program is further configured to cause the engine to execute the ETL script to load the data into the database.

In certain embodiments the engine is part of an ETL tool, and the key comprises a license signature.

In some embodiments the key comprises other than a license signature.

In various embodiments the encrypted ETL script comprises an object with a hidden attribute.

In particular embodiments the key is entered as a string.

In certain embodiments the key is selected from a license library.

Some embodiments further comprise utilizing a staging repository to export, upgrade a repository version, and export again.

In particular embodiments the key comprises one of a plurality of keycodes, the method further comprising moving objects between different keycode zones utilizing an export mechanism.

In various embodiments the ETL script comprises a block, and the encrypted script comprises a signature, an encrypted block, and a length of the encrypted block.

The following detailed description and accompanying drawings provide a better understanding of the nature and advantages of embodiments.

BRIEF DESCRIPTION OF THE DRAWINGS

FIG. 2C is a screen shot showing script of a custom ETL function.

FIG. 4 shows an example of an encrypted ATL format.

DETAILED DESCRIPTION

Described herein are catalog-based systems and methods providing content protection of ETL scripts according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments encrypt Extract, Transform, Load (ETL) scripts that are created for an initial customer, against access and copying by unauthorized third parties. Such protection preserves the economic value of the script for its third party developer, for re-use with later customers (who could otherwise just copy the script from the initial customer). A new hidden attributed is introduced to indicate protection of an object used in an ETL utility. This hidden attribute comprises an ownership label indicating possession of that object. A customer will not see this hidden attribute via the ETL utility. The hidden attribute may be assigned programmatically during a protecting process, and its value may be a current keycode, for example a licensing key signature. The protected object thus has the attribute signature, and its value does not match any current keycode known to the customer. The signature used for decrypting the script could be supplied by the developer of the ETL script.

Figure 1A:
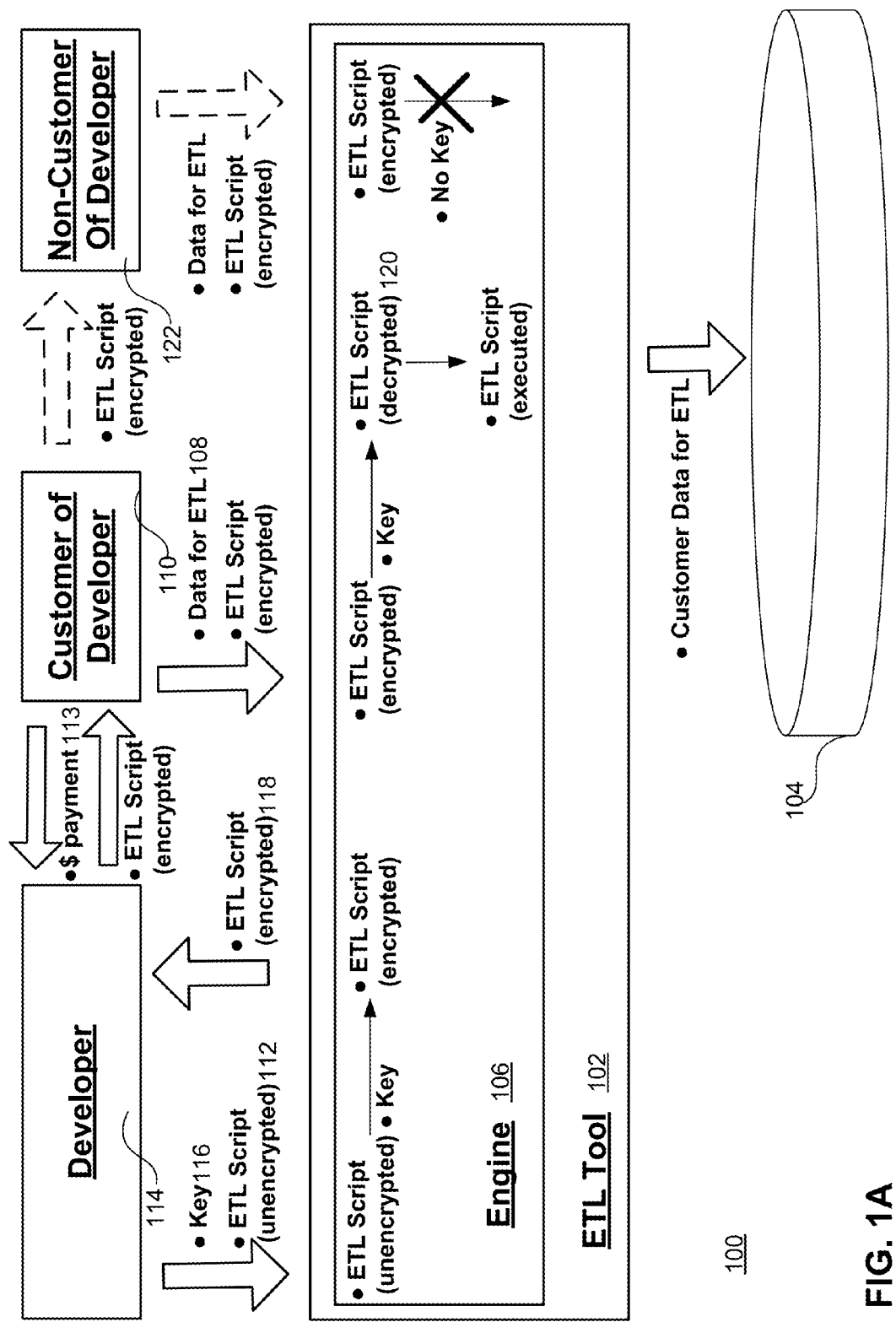
FIG. 1A shows a simplified view of a system according to an embodiment.

FIG. 1A presents a simplified view of a system according to an embodiment that is useful in protecting content of ETL scripts. In particular, system 100 comprises an ETL tool 102 that is in communication with an underlying database 104.

The ETL tool includes an engine 106 that is useful in performing ETL of incoming data 108 from a customer 110. To that end, the engine is configured to process and execute an ETL script 112.

That ETL script is created by the developer for the customer, in exchange for payment 113. While the ETL script provides functionality allowing the customer to perform ETL of its data, the developer retains the rights in the underlying ETL script itself—e.g., for reuse in allowing other customers of the ETL tool to load their databases as well. The developer thus seeks to protect the ETL script itself, while allowing its use by the customer.

Accordingly, the ETL script provided in unencrypted form by the third party developer/partner 114. The developer/partner is also in possession of a key 116 to encrypt the ETL script. The developer/partner supplies that key to the ETL tool, together with the unencrypted ETL script it has created.

The engine then utilizes the key to convert the ETL script to encrypted form 118. In certain embodiments, the key may already be known to both the developer and the ETL tool, for example a signature of the developer's license to use the ETL tool.

Thus protected, the encrypted ETL script is free to be shared by the developer with the customer. The customer receives the encrypted ETL script, and provides it to the engine of the ETL tool together with the data.

Then, internal to the ETL tool, the engine converts the encrypted ETL script to decrypted form 120 utilizing the key. The engine executes the decrypted ETL script upon the received data, thereby allowing the tool to perform ETL upon the data.

As indicated by dashed lines in FIG. 1, the customer is free to share the ETL script with others, including a non-customer 122 of the developer. The ETL script that is shared, however, is in encrypted form. It is thus useless to perform the ETL function, unless first decrypted internally. And, such decryption is not available unless the ETL tool has been supplied with the key by the developer. In this manner, utilizing encryption/decryption of ETL script internal to an ETL tool according to key supplied by a third party developer, content of the ETL script is protected against unauthorized access and copying (e.g., by a non-customer of the developer).

Figure 1B:
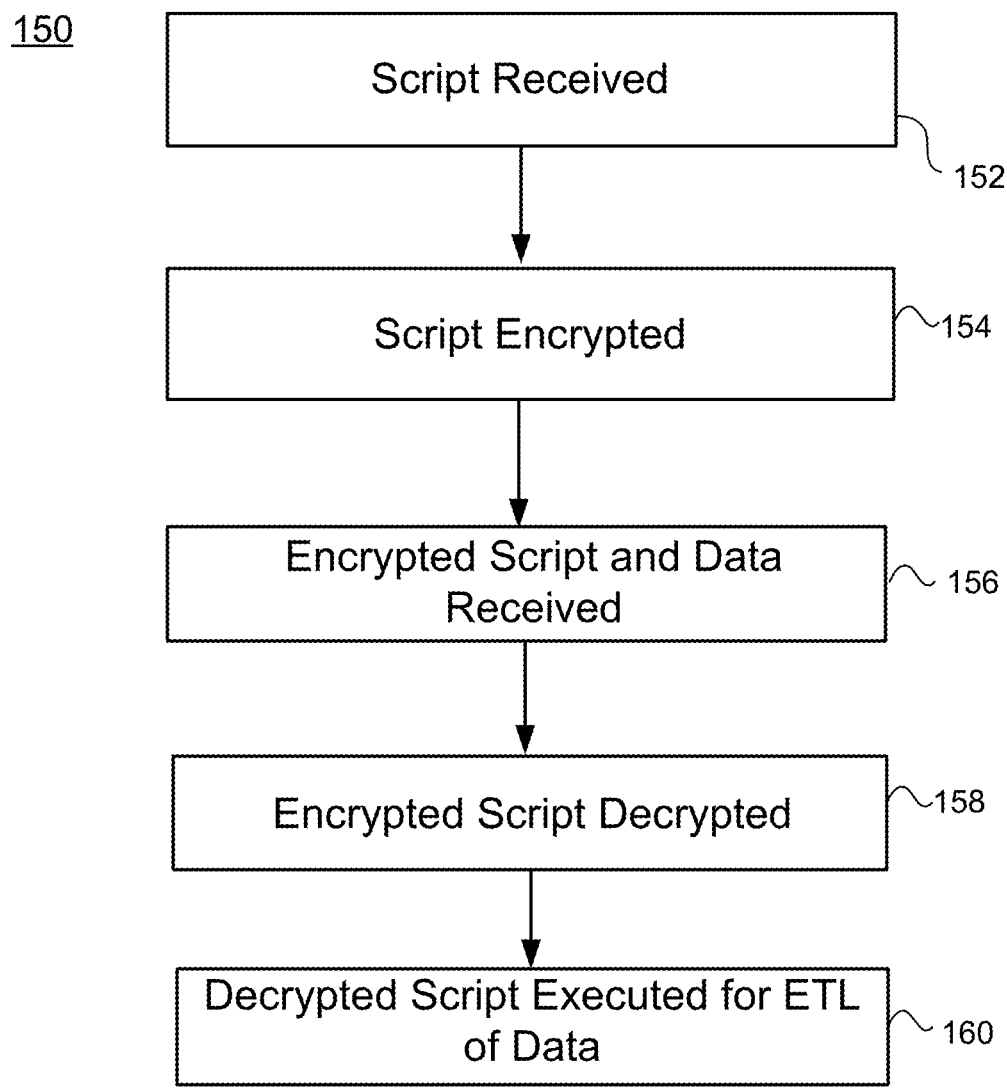
FIG. 1B is a simplified process flow according to an embodiment.

FIG. 1B is a simplified flow diagram showing a method 150 of ETL script content protection according to an embodiment. In a first step 152 an engine receives an ETL script and a key from a developer.

In a second step 154 the engine encrypts the ETL script utilizing the key.

In a third step 156 the engine receives from a customer, data for ETL into a database. In a fourth step 158, the engine decrypts the encrypted ETL script.

In a fifth step 160, the engine executes the decrypted ETL script on the data to perform ETL thereof, into a database.

Further details regarding mechanisms providing content protection for ETL scripts, are now provided in connection with the following example.

EXAMPLE

One example of ETL script content protection according to an embodiment, is now presented in connection with software available from SAP SE of Walldorf, Germany ("SAP"). In particular, SAP is a purveyor of databases that are organized according to a particular structure.

Figure 2A:
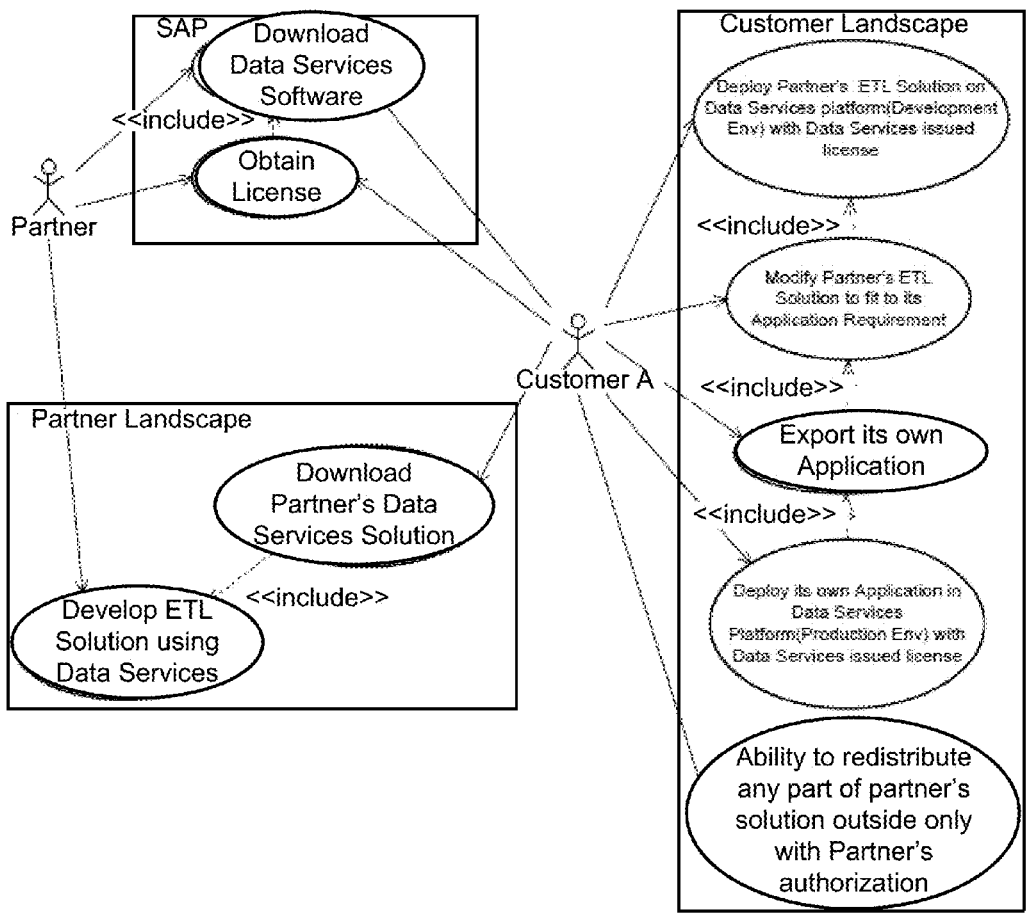
FIG. 2A is a simplified block diagram showing a landscape of entities involved in the deployment and use of a database system.

FIG. 2A is a simplified diagram showing various entities who may become involved working with SAP database technology. One such entity is a customer.

In particular, the customer is interested in obtaining a database structure from SAP, and then populating that database with data relevant to its business. However, the customer may not have sufficient detailed expertise in database architecture, and the ETL process may be beyond its resources available in-house.

Accordingly, FIG. 2A shows another entity—a third party developer of ETL scripts who is also referred to herein as the partner. The partner is affiliated with SAP, and hence has detailed knowledge of SAP's database architecture. The partner is engaged by the customer to create functions interacting with the SAP database to accomplish ETL of customer data.

As mentioned previously, a database provided by SAP may need to be populated with relevant data from outside sources that are organized according to different principles. The Extract, Transform, and Load (ETL) process describes the manner by which such outside data is (E)xtracted from external sources, (T)ransformed into a format recognizable by an underlying target database, and then (L)oaded into that target database.

Figure 2B:
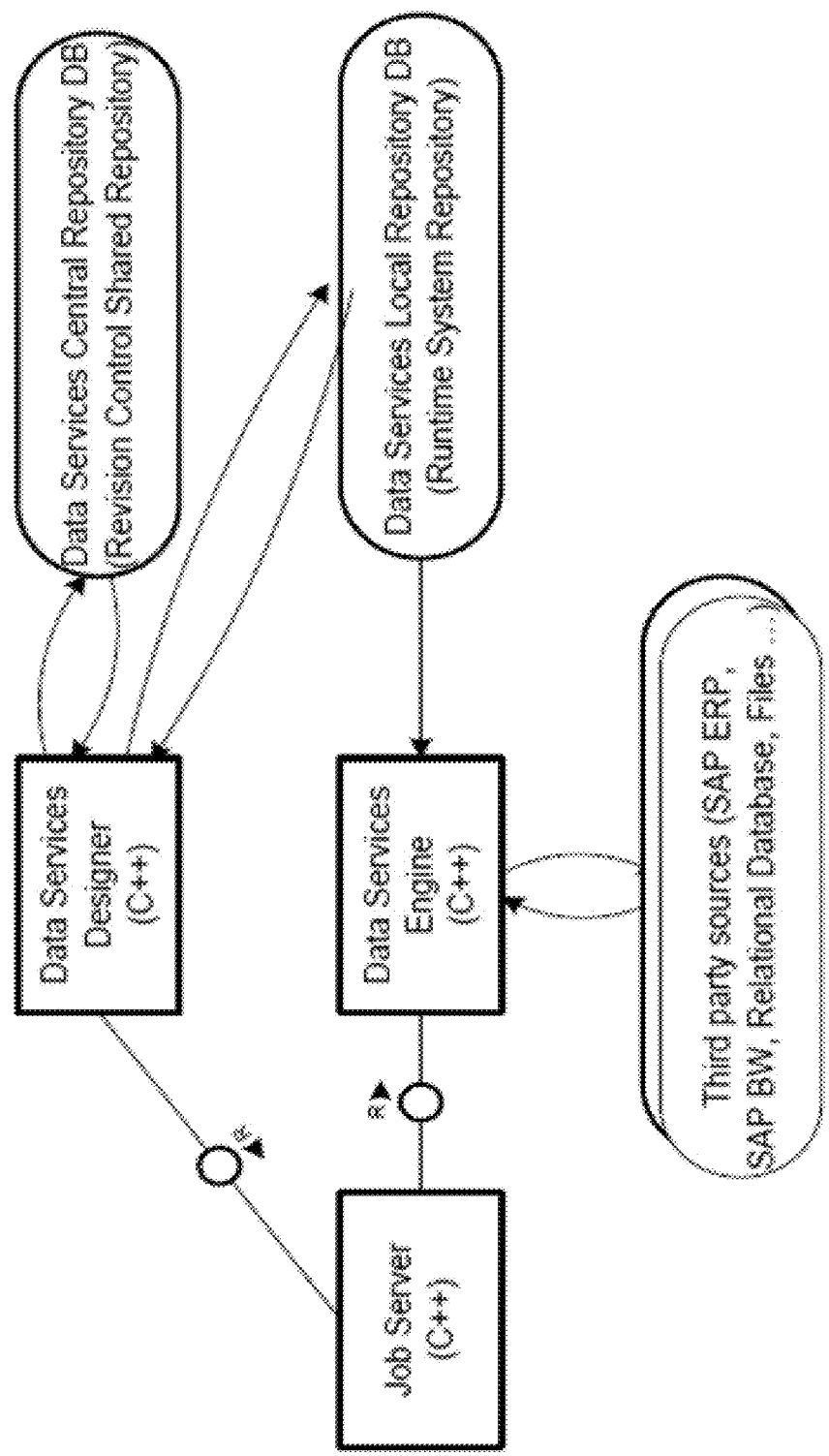
FIG. 2B is a block diagram showing a simplified view of an ETL system architecture.

FIG. 2B is a block diagram showing a simplified view of an ETL system architecture provided by SAP. The Designer component of the system of FIG. 2B is used to model an ETL Process that is also referred to herein as an ETL job.

The Engine component of the system of FIG. 2B is a transformation engine which is used to execute the ETL job.

The Job Server component receives the request to execute ETL job, and launches the engine. It also manages job's trace log, monitoring log, and error log.

The Local repository is a defined set of database tables to store its ETL modeling language (known as ATL), metadata of source, and target objects.

Designer generates ETL modeling language and metadata, and stores in the repository. The Engine reads the ETL modeling language from repository, creates runtime objects, and executes ETL jobs.

The Central repository is used as a version control system and shared repository. It is used by production, Quality Assurance (QA), and developers, to transport ETL language from one environment to other (e.g., as part of Lifecycle Management).

Various levels of data services constructs are used for defining ETL process logic. Functions (including script functions) represent a lower level construct. Higher level constructs include dataflows and workflows.

Examples of functions are substring, lookup function, soundex, Julian Date etc. Standard built-in functions may be shipped with Data Services. The content of those functions may inherently be is protected, as the underlying logic of these functions is expressed in C++ binary code only, which is very difficult to reverse-engineer.

However, additional custom functions (including script functions) can be developed by a Data Services customer including its partner. One example of such a script function (Julian Date) is shown in FIG. 2C. The repository table AL_EXT_FUNCTEXT stores the logic.

As mentioned previously, script functions created by a partner at the request of a SAP customer, can represent significant added effort and economic value. Moreover, these script functions can potentially be reused for other customers, and hence a partner may seek to retain rights in the script for these purposes (e.g., adaptation for use with other customers).

Unprotected, however, the scripts are simple text strings that are vulnerable to easy copying and reproduction. Accordingly, embodiments as described herein are drawn to mechanisms for protecting these scripts from copying.

Script content protection according to embodiments may be accomplished in this example in the following manner. The Current Data Services keycode is one of the keycodes in License Manager on the computer where import/export happens. This could be the developer's computer/keycode or some combination with the customer's computer/keycode.

In order to indicate that an object is protected, a new hidden attribute is introduced:
"Signature"='CG21C-3P04KZ9-227NN9MF-WDY8".

The user will not be able to see this attribute (e.g., in Diff utility, Show ATL/XML, etc.) Rather, the attribute will be assigned programmatically during a protecting process. Its value is current Data Services keycode.

Data import is now described. In the Designer component and engine: if file (ATL/XML) is encrypted, the current DS keycode will be used as a passphrase to decrypt. The user will not be asked for a passphrase.

If the file is not encrypted, behavior is current. The user has to provide passphrase to decrypt passwords.

Data export into file in Designer component and engine is now described. There are two scenarios.

According to a first scenario, there is a protected object in the export list. Here, the file will be encrypted with the current DS keycode as a passphrase. The user will not be asked for passphrase.

According to a second scenario, none of the exported objects is protected. Here, behavior is current unless user checks the 'Protect content' button.

Figure 3A:
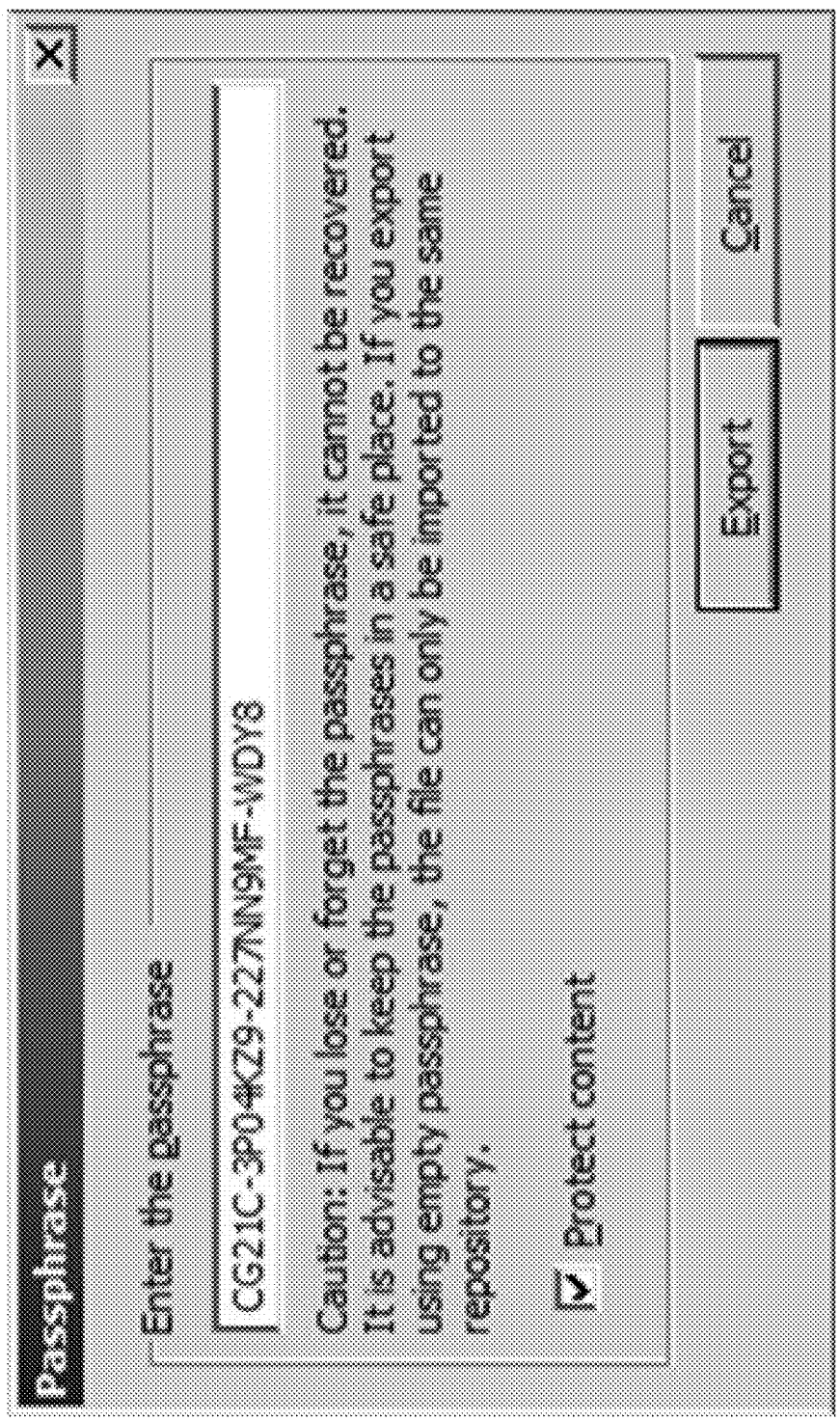
FIG. 3A shows a sample screen shot to enter a passphrase in an example.

FIG. 3A shows a sample screen shot to enter a passphrase. Here, checking the 'Protect content' button will have the following results.

The "Signature" attribute will be created for all exported unprotected objects. The value of the attribute is the current DS keycode. So, objects become protected.

Also, the whole file will be encrypted with provided passphrase. The passphrase should be the DS keycode on the computer to receive the imported file (customer's). Otherwise, the import will fail.

Protected objects in Data Services Designer are handled as follows. The following restrictions are imposed for protected objects in Designer.

When a user replicates protected object, new object becomes protected too with parent signature.

A user may see the ATL of the protected object, but will not be able to copy the text.

A user could copy protected object elements (like transforms on dataflow). The object, where elements are pasted, becomes protected with parent signature.

Before updating Data Services license keycode, it is confirmed that encrypted ATLs (with previous keycode) are imported into the repository.

Figure 3B:
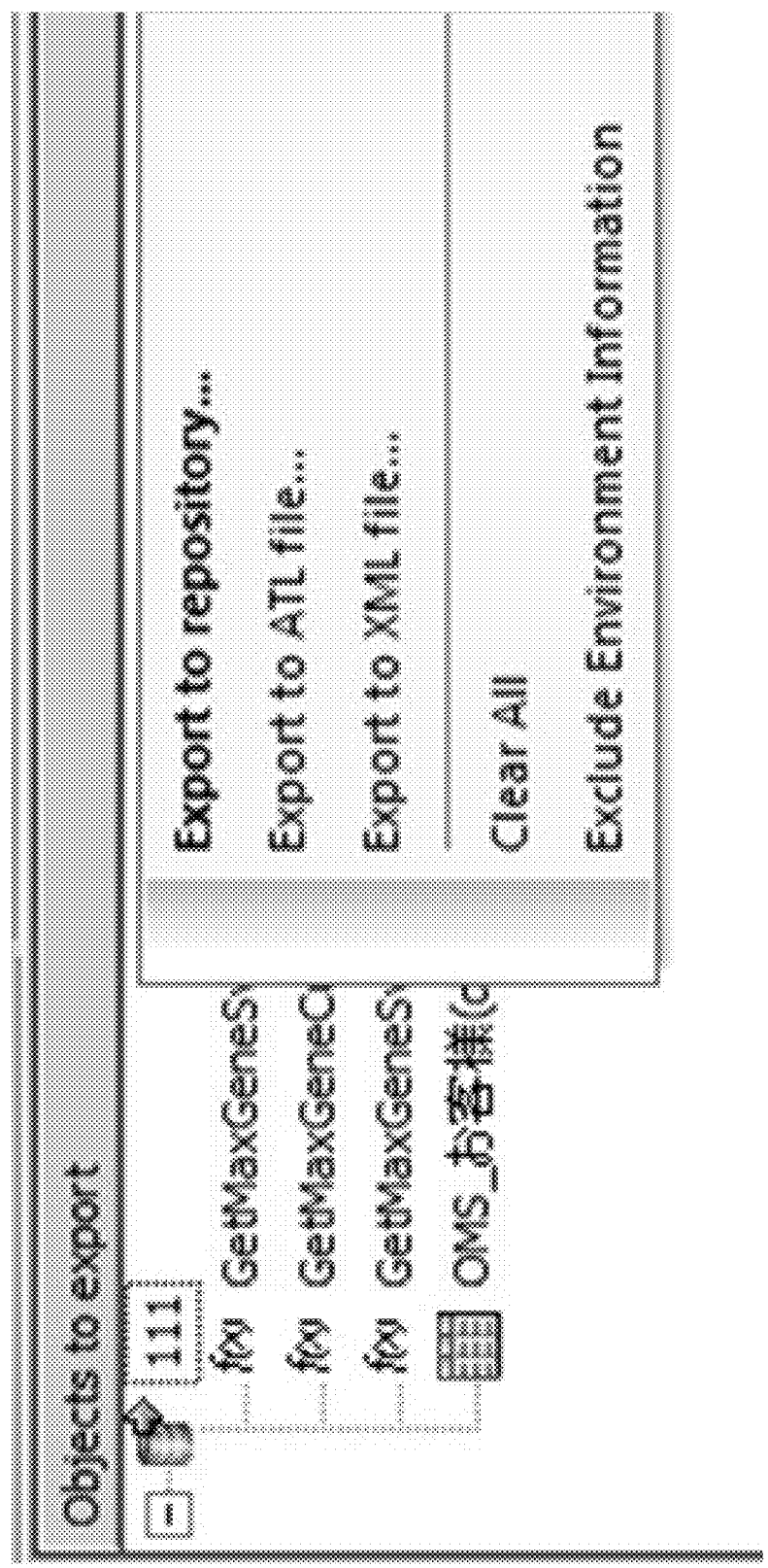
FIG. 3B shows a staging repository used to: export, upgrade version, and export again, according to an example.

If an organization has several Data Services keycodes, a repo-to-repo export mechanism could be used to move objects between different 'keycode zones'. If repositories have different versions, the staging repository could be used to: export, upgrade version, and export again. This is shown in the screenshot of FIG. 3B.

Interfaces/Communication Handling/Dependent Components are now described. A License manager component should be enhanced to provide one or more of the following functionalities.

Figure 3C:
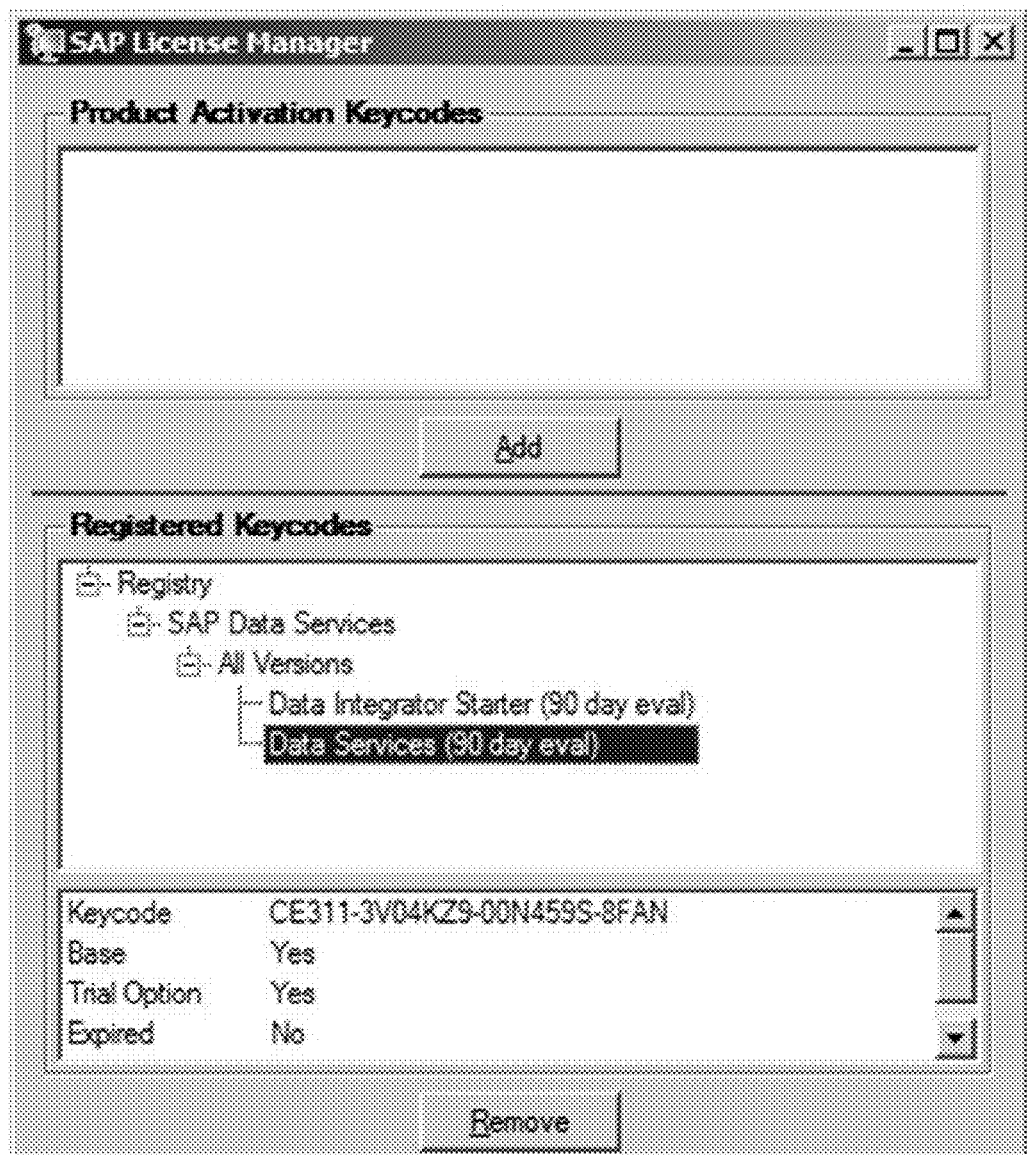
FIG. 3C shows writing a current valid keycode into a Buffer in an example.

One functionality may provide a current license keycode as a string. This approach may use the expose method in LicenseVerifier.dll:
void GetKeycode(char* Buffer, int nBufferSizeInBytes)
As shown in the screenshot of FIG. 3C, this writes a current valid keycode (the one in use, because several keycodes are allowed to be registered) into the Buffer in UTF16 encoding.

Another functionality provides a License library available for UNIX platforms. In the Engine, the following functionality is changed.

X: exports the repository to file "repo_export.atl"
XX[L]: exports the repository to file "export.xml"
XI<Filename.xml>: imports information into the repository
Xp@<ObjectType>@<FileName>: exports all repository objects of the specified type to the specified file in ATL format.
Xp@<ObjectType>@<FileName>@<ObjectName>: exports the specific repository object to the ATL file
Xp@<ObjectType>@<FileName>@<ObjectName>@DE: exports the specific repository object and its dependents with datastore information to the ATL file.
Xp@<ObjectType>@<FileName>@<ObjectName>@D: exports the specified repository object and its dependents to the specified file in ATL format, excluding datastore information.
XX[L]@<ObjectType>@<FileName>: exports the specific repository objects to the XML file
XX[L]@<ObjectType>@<FileName>@<ObjectName>: exports the specific repository object to the XML file
XX[L]@<ObjectType>@<FileName>@<ObjectName>@DE: exports the specific repository object and its dependents with datastore information to the XML file XX[L]
@<ObjectType>@<FileName>@<ObjectName>@D:
exports the specific repository object and its dependents without datastore information to the xml file
   <ObjectType> can be one of the following:
P: Exports all Projects
J: Exports all Jobs
W: Exports all Work flows
D: Exports all Dataflows
T: Exports all Idocs
F: Exports all user defined File formats
X: Exports all XML and DTD Message formats
S: Exports all Datastores
C: Exports all Custom functions
B: Exports all COBOL Copybooks
E: Exports all Excel workbooks
p: Exports all System Profiles
v: Exports all Substitution Parameter Configurations
K: Exports all SDK transform Configurations
[L]—Optionally, export a lean XML.
   Xi<ObjectType>@<ObjectName>: Imports the specified object into the repository.
   f<Filename.atl>[@NoUpgrade]: Imports information from ATL into the repository. By default this option upgrades the SDK Transforms prior to importing them to repository, and does not import the read-only configurations. Specify @NoUpgrade to ignore the upgrade step or to import read-only configuration ATLs (e.g. sample_sdk_transform.atl).

For the user interface, the passphrase dialog will be enhanced with Protect content checkbox.

ATL file encryption is now described. The file is encrypted using current BCM library. Average rate of inscription is 1 plain character→14 bytes.

The encrypted ATL file consists of encrypted blocks. Each block is for "CREATE" statement—the first class object in Designer.

Figure 5:
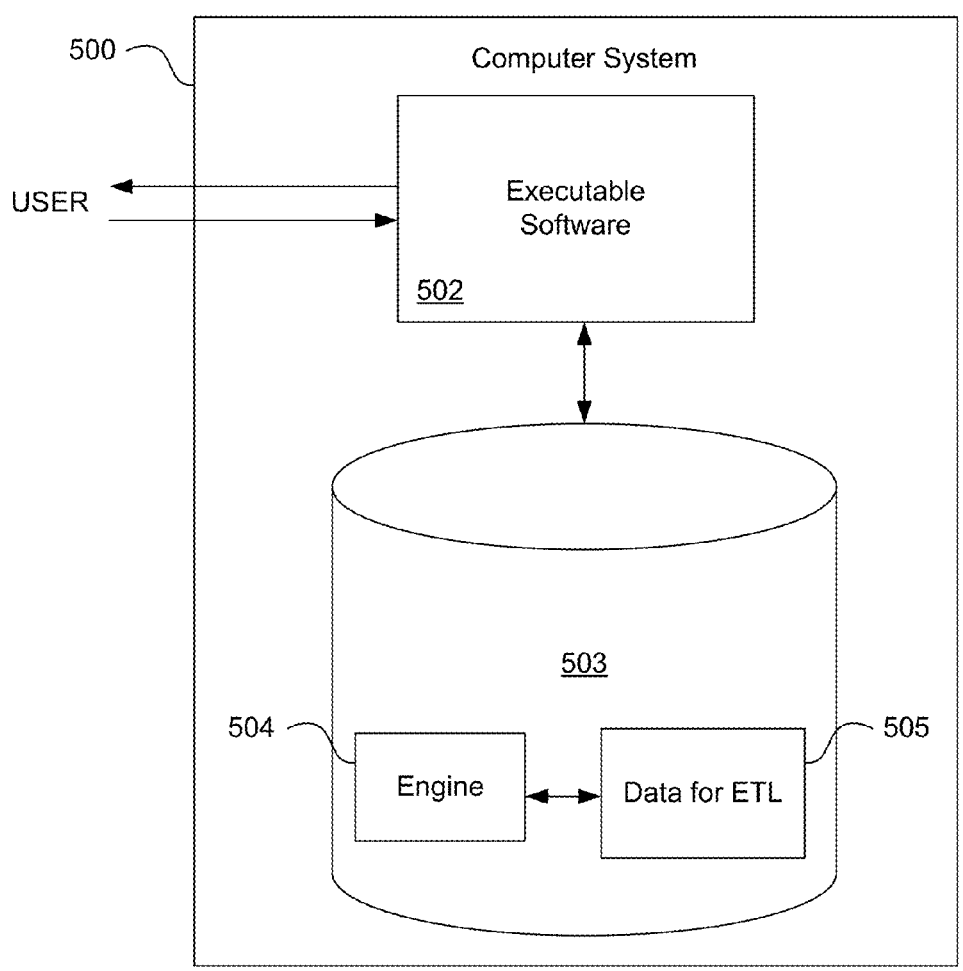
FIG. 5 illustrates hardware of a special purpose computing machine configured to enforce content protection for ETL scripts according to an embodiment.

The first block is for ATL comments:
_AW_Repository_Version '14.1.1.0000';
_AW_Product_Version '14.1.2.338';
_AW_ATL_Locale 'eng_us.utf-8';

FIG. 4 shows the encrypted ATL format (utf8):
1. Data Services 32 bytes signature—the same for any encrypted file;
2. 4 bytes with the length of encrypted block in bytes;
3. Encrypted block;
4. 4 bytes with the length of encrypted block in bytes;
5. Last encrypted block FIG. 5 illustrates hardware of a special purpose computing machine configured to enforce content protection of ETL scripts according to an embodiment. In particular, computer system 501 comprises a processor 502 that is in electronic communication with a non-transitory computer-readable storage medium 503. This computer-readable storage medium has stored thereon code 505 corresponding data for ETL. Code 504 corresponds to an engine of an ETL tool. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 6:
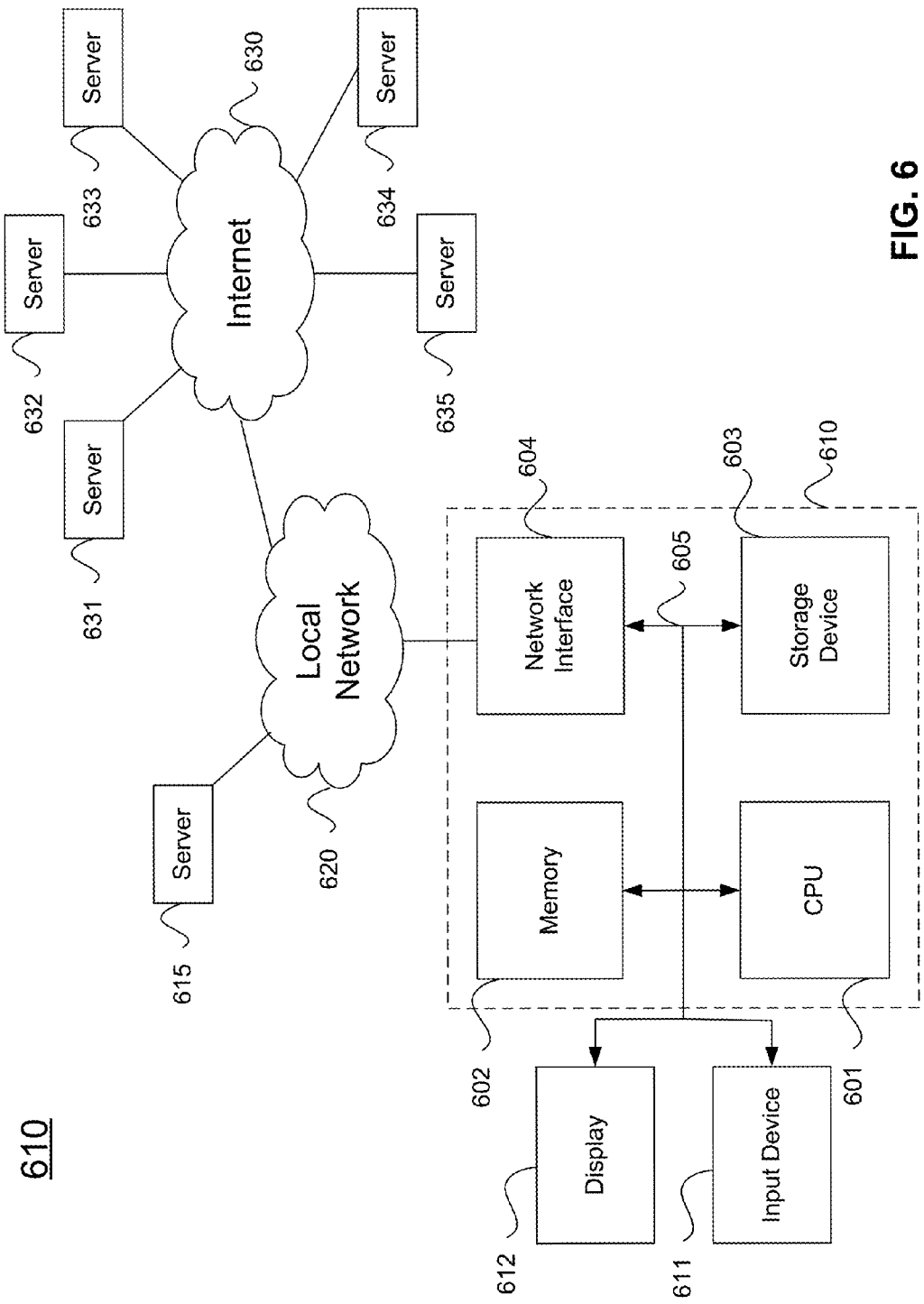
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 2511 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing an engine in communication with a database;
the engine receiving from a developer, a cryptography key and an Extract, Transform, and Load (ETL) script, wherein the cryptography key comprises one of a plurality of keycodes, and moving objects between different keycode zones utilizes an export mechanism controlled by a license manager;
the engine generating by a hardware processor an encrypted ETL script utilizing the cryptography key;
the engine receiving from a customer of the developer, data and the encrypted ETL script;
the engine decrypting the encrypted ETL script utilizing the cryptography key to produce the ETL script; and
the engine executing the ETL script to load the data into the database.

2. A method as in claim 1 wherein the engine is part of an ETL tool, and the cryptography key comprises a license signature.

3. A method as in claim 1 wherein the cryptography key comprises other than a license signature.

4. A method as in claim 1 wherein the encrypted ETL script comprises an object with a hidden attribute.

5. A method as in claim 1 wherein the cryptography key is entered as a string.

6. A method as in claim 1 wherein the cryptography key is selected from a license library.

7. A method as in claim 1 further comprising utilizing a staging repository to export, upgrade a repository version, and export again.

8. A method as in claim 1 wherein the ETL script comprises a block, and the encrypted script comprises a signature, an encrypted block, and a length of the encrypted block.

9. A method as in claim 1 wherein the database comprises an in-memory database, and the engine comprises an in-memory database engine of the in-memory database.

10. A non-transitory computer readable storage medium embodying a computer program for performing a method, said method comprising:
an engine provided by a first entity and in communication with a database;
the engine receiving a cryptography key and an Extract, Transform, and Load (ETL) script from a second entity comprising a developer, wherein the cryptography key comprises one of a plurality of keycodes, and moving objects between different keycode zones utilizes an export mechanism controlled by a license manager;
the engine generating by a hardware processor an encrypted ETL script utilizing the cryptography key;
the engine receiving from a third entity comprising a customer of the developer, data and the encrypted ETL script;
the engine decrypting the encrypted ETL script utilizing the cryptography key to produce the ETL script; and
the engine executing the ETL script to load the data into the database.

11. A non-transitory computer readable storage medium as in claim 10 wherein the cryptography key comprises a signature of a license of the developer to use the engine.

12. A non-transitory computer readable storage medium as in claim 11 wherein the cryptography key is selected from a license library.

13. A non-transitory computer readable storage medium as in claim 10 wherein the cryptography key comprises other than a signature of a license of the developer to use the engine.

14. A non-transitory computer readable storage medium as in claim 10 wherein the encrypted ETL script comprises an object with a hidden attribute.

15. A non-transitory computer readable storage medium as in claim 10 wherein the ETL script comprises a block, and the encrypted ETL script comprises a signature, an encrypted block, and a length of the encrypted block.

16. A non-transitory computer readable storage medium as in claim 10 wherein the database comprises an in-memory database, and the engine comprises an in-memory database engine of the in-memory database.

17. A computer system comprising:
one or more hardware processors;
a software program, executable on said computer system, the software program configured to cause an engine in communication with a database to:
receive from a developer, a cryptography key and an Extract, Transform, and Load (ETL) script, wherein the cryptography key comprises one of a plurality of keycodes, and moving objects between different keycode zones utilizes an export mechanism controlled by a license manager;
generate by a hardware processor an encrypted ETL script utilizing the cryptography key;
receive from a customer of the developer, data and the encrypted ETL script;
decrypt the encrypted ETL script utilizing the cryptography key to produce the ETL script; and
execute the ETL script to load the data into the database.

18. A computer system as in claim 17 wherein the cryptography key comprises a license signature.

19. A computer system as in claim 17 wherein the encrypted ETL script comprises a hidden attribute.

20. A computer system as in claim 17 wherein the database comprises an in-memory database, and the engine comprises an in-memory database engine of the in-memory database.

* * * * *